Nov. 10, 1970      V. D. COOMBS      3,538,756

ECCENTRIC MASS-ROTOR-MOTOR MECHANICAL TESTING DEVICE

Filed Oct. 7, 1968      3 Sheets-Sheet 1

INVENTOR.
VERNER D. COOMBS
BY Charles L. Lovercheck
attorney

Nov. 10, 1970     V. D. COOMBS     3,538,756

ECCENTRIC MASS-ROTOR-MOTOR MECHANICAL TESTING DEVICE

Filed Oct. 7, 1968     3 Sheets-Sheet 2

INVENTOR.
VERNER D. COOMBS
By Charles L. Lovercheck
attorney

Nov. 10, 1970     V. D. COOMBS     3,538,756
ECCENTRIC MASS-ROTOR-MOTOR MECHANICAL TESTING DEVICE
Filed Oct. 7, 1968     3 Sheets-Sheet 3

INVENTOR.
VERNER D. COOMBS
By
Charles L. Lovercheck
attorney

United States Patent Office 3,538,756
Patented Nov. 10, 1970

3,538,756
ECCENTRIC MASS-ROTOR-MOTOR MECHANICAL TESTING DEVICE
Verner D. Coombs, 230 Meadowbrook Lane, Vestal, N.Y. 13850
Filed Oct. 7, 1968, Ser. No. 765,276
Int. Cl. G01n 3/32
U.S. Cl. 73—91
22 Claims

ABSTRACT OF THE DISCLOSURE

This application describes a method and apparatus for producing periodically-alternating forces, to be used in the testing-to-mechanical-failure of specimens of materials and of parts of machines. The force-generating device consists of a freely-rotating mass, which is excited to rotate by periodic magnetic pulses upon a magnetically-permeable portion of the mass. The device operates in the manner of a simple synchronous motor with an unbalanced rotor. The low level of power required to maintain the rotation and the small masses of the stationary parts of the motor permit great versatility in the types of mechanical-failure tests which can be performed, in the ease of preparing such tests and in the manner of detecting and recording the mechanical failure "lives."

BACKGROUND OF INVENTION

Parts of equipment employing mechanical actions are often subject to mechanical failure (or the loss of the ability of the parts to perform their intended functions); such failure may be strongly contributed to, or precipitated by, dynamic loading conditions. The dynamic loading may consist of various combinations of alternating loads and static loads; it may result in the application, to a material or part, of various situations of combined tensile, compressive and shear stresses, producing various combinations of elastic and plastic strains. The consequences of such dynamic stress and strain combinations can be mechanical failures of a number of types.

In a material or part intended to perform a dynamic load-carrying function, either fatigue fracture or excessive plastic deformation can destroy that load-carrying capacity, as a direct consequence of the dynamic loading. In bearings of either the sleeve type or the rolling-element type, imposition of dynamic loads can often damage the bearing surface "finish" by scuffing wear (due to momentary break-through of the lubricating film) or by similar surface damage mechanisms, resulting in the development of high temperatures, in the development of high frictional resistance to bearing motion (bearing failure) and in the possible initiation of fatigue fractures (bearing failures) in the bearing surface materials. Where parts of machinery are joined mechanically by an interference fit, the imposition of dynamic loads and stresses at the interference-fit surfaces can cause "slippage," or undesired relative motion, to occur between the joined parts; this slippage would represent a failure of the part assembly. These several examples have been given to illustrate failure problems in which the invention disclosed herein could be of benefit.

Two previous inventions are cited, which provide for testing arrangements and associated advantages similar to those described above for the present invention; these are covered by Pats. Nos. 3,187,566 and 3,264,865. The fundamental difference between these previous inventions and the present invention is as follows: The force-generating device employed in mechanical failure testing in the invention of Pats. Nos. 3,187,566 and 3,264,865 is a mechanically-actuated synchronous motor with an unbalanced rotor, whereas the force-generating device of the present invention is an electromagnetically-actuated synchronous motor with an unbalanced rotor. That is, the rotor of the force-generating device in each of the previous cited inventions receives the power required to sustain the rotor rotation against losses due to windage and friction from a mechanical vibration imposed upon the rotor by the mechanical oscillation of a "shake table" to which the rotor and other members of the testing fixture are coupled. In these previous inventions, no claim is made involving the use of a magnetic field pulsation to sustain the rotation of a rotor of a force-generating device, as is claimed in the present application.

It is, accordingly, an object of the invention to provide an improved fatigue-fracture testing machine which demonstrates greater speed and accuracy of operation, greater ease and convenience in setting-up of tests and greater simplicity and lower cost of construction or manufacture.

Another object of the invention is to provide an improved means for generating cyclic forces of known magnitudes, which may be employed in the mechanical testing, other than fatigue-failure testing, of materials and parts, such testing including fretting-wear testing, testing for the holding capacity of an interference fit, and other types of failure testing involving dynamic loads.

With the above and other objects in view, the present invention is illustrated by the combination and arrangement of parts hereinafter more fully described, presented in the accompanying drawings and more particularly pointed out in the appended claims, it being understood that changes may also be made in the form, size, proportions and minor details of construction without departing from the spirit or sacrificing any of the advantages of the invention.

Figure 1:
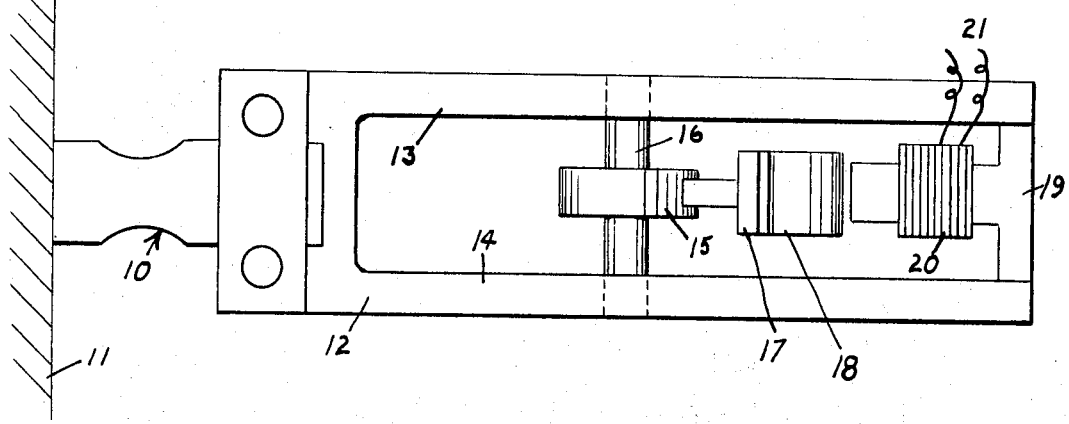
FIG. 1 is a top schematic view of one embodiment of the invention.
Figure 2:
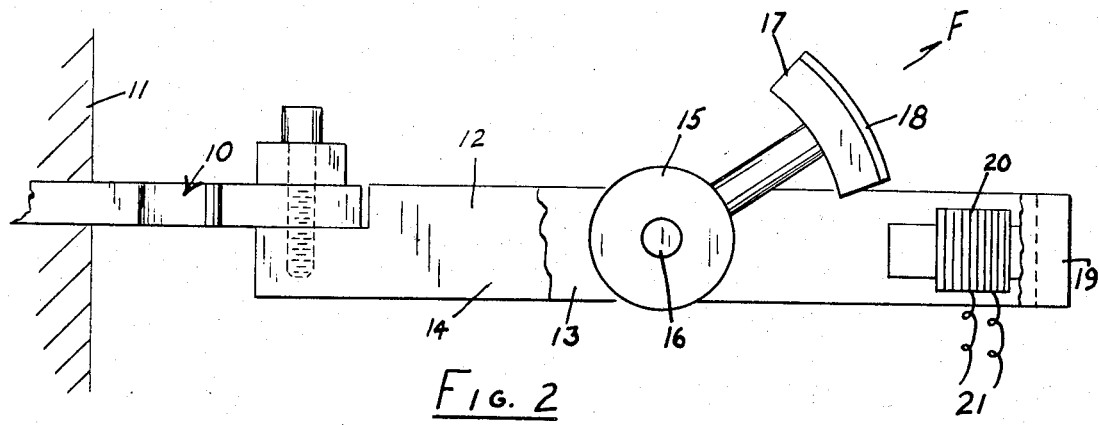
FIG. 2 is a side schematic view of the embodiment shown in FIG. 1.

Now with more particular reference to the drawings, the embodiment shown in FIG. 1 and FIG. 2 shows a specimen 10 to be fatigue tested under bending stresses. The stationary clamping member 11, which could be a machine frame or the like, is attached to and supports the specimen 10, which in turn supports the lever arm 12. The lever arm 12 has extensions 13 and 14, which together comprise a yoke. A bearing pin 16 is attached to extensions 13 and 14 and extends across the yoke. A bearing 15 is mounted upon and is supported by the pin 16. A mass 17 is attached to and supported by bearing 15 on the outer end of arm shown; this mass 17 is eccentric to the axis of rotation of the bearing 15 and is freely rotatable about that axis. When the eccentric mass 17 is caused to rotate about the bearing 15 and pin 16, the centrifugal force F produced by the rotating eccentric mass 17 is transmitted to the stationary clamping member 11 through the bearing 15, the pin 16, and the extensions 13 and 14, the lever arm 12 and the specimen 10.

In this embodiment of the invention, the horizontal components of the centrifugal force produce small, and possibly negligible, stresses in specimen 10. The vertical components of the centrifugal force, acting upon lever arm 12, produce large moments and stresses in specimen 10. As the vertical components of the centrifugal force are periodically-alternating forces, the large stresses produced in specimen 10 by the vertical force components will be periodically-alternating stresses.

The eccentric mass 17 has affixed to it an element 18 composed of some material of high magnetic permeability. The electromagnet 19, which is shown in FIGS. 1 and 2 affixed to the ends of extensions 13 and 14, generates a pulsating magnetic field. This magnetic field exerts a pulsating force upon the element 18, causing the element 18 and the eccentric mass 17 to rotate about pin 16 and bearing 15. The electromagnet 19 has means to vary its frequency of actuation, such as a source of electric power providing periodic voltage impulses of variable frequency. The solenoid 20 provides the excitation for the electromagnet 19; and the solenoid 20 is itself excited by the voltage impulses supplied to the solenoid-winding-conductor leads 21, which are shown in FIGS. 1 and 2.

When the element 18 and the mass 17 are driven in rotation by the pulsating magnetic forces exerted by the electromagnet 19, the entire assembly of FIGS. 1 and 2 acts as a simple synchronous motor with an unbalanced rotor. The bearing 15, the eccentric mass 17, and the element 18, and any members joining mass 17 to bearing 15, act as the unbalanced rotor of the motor; the electromagnet 19 acts as a stator field pole of the motor. The pin 16, the extensions 13 and 14, the arm 12, the specimen 10 and the stationary clamping member 11 together act as the structural frame members of the motor. As demonstrated by the embodiment of FIGS. 1 and 2, the invention is a means for generating periodically-alternating forces to be used in mechanical failure testing, wherein the means consists of a synchronous motor with an eccentric mass incorporated into the rotor of the motor.

In the past, synchronous motors have been used in mechanical-failure-testing machines to drive rotating eccentric masses, in order to generate periodically-alternating forces. In such instances, however, the rotating eccentric masses have been entities separate from the synchronous driving motors and have been supported by bearings separate from those bearings supporting the rotors of the synchronous driving motors. The eccentric masses have been coupled to the driving motors by flexible couplings intended to transmit only the driving torques, and to transmit no appreciable linear forces, between motors and eccentric masses. Therefore, in each such instance, the centrifugal force generated by the rotating eccentric mass was not permitted to be exerted upon the rotor or the supporting frame of the motor. Certain disadvantages were thereby avoided. For example, it was not necessary to account for inertial reactions (from the rotor and frame masses) to the centrifugal force, in calculating the effective alternating force components exerted upon the test specimen.

In the invention described herein, the eccentric mass is part of the rotor of the simple synchronous motor; and therefore the inertial reactions of the rotor, and of other members of the motor, can modify the centrifugal force generated by the rotating eccentric mass before that force (or components thereof) can be applied to the test specimen. However, in manners hereinafter described, these inertial reactions can be caused to be insignificantly low; and when this is achieved, some very attractive benefits, also hereinafter described, are provided to mechanical failure testing, due to the feature of having the eccentric mass incorporated into the synchronous motor rotor.

An example of the manners in which the inertial reactions of the rotor and frame members can be caused to be significantly low, in comparison to the centrifugal force generated by the rotating eccentric mass, is described as follows. When, as illustrated in FIGS. 1 and 2, the eccentric mass 17 has been incorporated into the rotor (the assembly of the bearing 15, the magnetically-permeable element 18 and any members joining these to the eccentric mass 17) of the synchronous motor, it is then necessary to employ only one bearing (the bearing 15) to support all of the members of the unbalanced rotor. This use of a single bearing serves to reduce the amount of rotor mass that does not directly contribute to the generation of the centrifugal force. In addition, as illustrated in FIGS. 1 and 2, the magnetically-permeable element 18 can act as part of the eccentric mass 17; this serves to employ the mass (the mass of element 18) necessary for driving the rotor in rotation also in the capacity of contributing to the generation of the centrifugal force.

Figure 3:
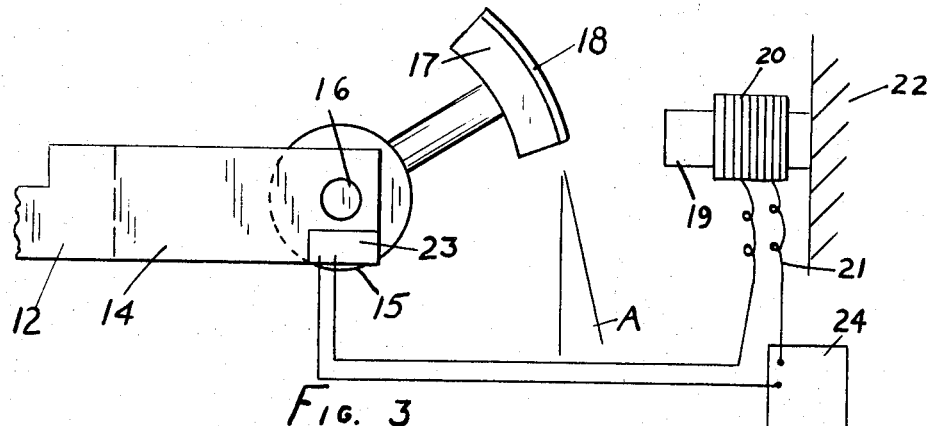
FIG. 3 is a schematic view of an embodiment of the invention, showing an air jet for supplying impelling forces to the rotor of the invention, and showing the stator field pole (an electromagnet) detached mechanically from the rotor assembly.

A second example of the manners in which the inertial reactions of the rotor and frame members can be caused to be insignificantly low, in comparison to the centrifugal force generated, is described as follows. The use of a rotor of relatively low total mass and the use of a single bearing to support the rotor result in the expenditure of low power levels in maintaining the rotation of the synchronous motor rotor. The low levels of power necessary facilitate, in turn, the use of a single small stator field pole, the electromagnet 19 as shown in FIGS. 1 and 2, for supplying the power to the rotor. This single stator field pole, because of its low mass, provides very little inertial reaction to the generated centrifugal force. In addition, it is possible to completely eliminate any inertial reaction of the mass of the electromagnet 19 to the centrifugal force by detaching the electromagnet 19 from the extensions 13 and 14 and by mounting the electromagnet 19 on a separate stationary member, such as a machine frame or the like, as illustrated in FIG. 3. It is feasible to separate the stator field pole (the electromagnet 19) from the extensions 13 and 14, because the location of the single stator field pole with respect to the rotor is not critical to satisfactory driving of the rotor by the stator field pole, so long as the electromagnet 19 exerts the magnetic field in the rotational path of the synchronous motor rotor.

It can be seen therefore that the feature of incorporating the eccentric mass 17 firmly into the synchronous motor rotor (consisting of bearing 15, magnetically-permeable element 18 and any associated members of the rotor) contributes in several ways to provide a force-generating device of low mass, which offers low inertial reaction to the generated force. It is important to note that the force-generating device may be attached directly to, and supported partly or wholly by, the specimen 10 to be tested.

A number of benefits can be realized in mechanical-failure testing if the type of light-weight force generator (unbalanced-rotor synchronous motor) illustrated in FIGS. 1, 2, and 3 is used. The following example is presented as an illustration of some of the benefits. FIGS. 1 and 2 show a mechanical fatigue test set up. In this instance, the material specimen 10 is tested in reversed bending as a canti-lever beam; it is subjected to end loading by a vertical alternating component of centrifugal force F, until failure occurs as a fatigue crack initiation in specimen 10, or as a complete fracture of specimen 10. The specimen 10 is gripped by a stationary clamp 11. Attached to the "outboard" end of the specimen 10 is a lever arm 12, with extensions 13 and 14, which serves to provide a mechanical advantage in increasing applied moments on specimen 10 and also serves as a support for a journal, a bearing and a rotating mass, as described below. Parts of the lever arm 12 are the two extensions 13 and 14, which form a yoke. Extending across the outboard end of the yoke from one extension to the other is a pin 16, which serves as a journal for a bearing 15. The bearing supports a rotatable mass 17. It can be seen in FIG. 1 that the mass 17 is free to rotate about the pin 16, as an axis, and that, in rotating in such a manner, the mass 17 will cause an alternating bending moment (and some shearing, tension, and compression components of alternating force) to be imposed upon specimen 10. A magnetically-permeable element 18 is attached to the mass 17.

The rotation of the mass 17 (once initiated by suitable means, such as spinning the mass by a flick of the fingers or by impinging a jet of air A upon the mass, as shown in FIG. 3) can be sustained against the resistance of friction and windage by periodically imposing upon the mass 17, or upon some magnetically-permeable element 18 attached thereto, a magnetic field force impulse whenever mass 17 and element 18 are within the magnetic field region of an electromagnet 19. The electromagnet 19 is placed at some convenient location near the rotational path of the eccentric mass 17. The electromagnet 19 may be fixed either to the extensions 13 and 14, as illustrated in FIGS. 1 and 2; or the electromagnet 19 may be fixed to some stationary member, such as a machine frame 22 or the like, separate from the lever arm 12 and the extensions 13 and 14, as illustrated in FIG. 3.

The rotatable members of the assembly (i.e., the bearing 15, the eccentric mass 17, the magnetically-permeable element 18 and any members joining these members) comprise a member designated the "rotor." Those stationary members of the assembly which contribute to the production of magnet field impulses (i.e., the electromagnet 19, the solenoid 20 and the solenoid winding leads 21) comprise a member designated the "stator field pole."

The magnetic force impulses are applied to the rotor at some regular frequency and are produced by the application of periodic voltage impulses at that frequency to the solenoid 20 of the electromagnet 19 through the solenoid winding leads 21. Once the rotational action of the rotor has been synchronized with the action of the pulsating magnetic field from the stator field pole (that is, once both actions are occurring at the same frequency), and once the action of the rotor and the action of the magnetic field have been put "in phase" (that is, the element 18 approaches the effective field region of the stator field pole as the current in the solenoid 20 and the resulting magnetic field of the electromagnet 19 begin to increase), then the rotor receives energy consistently (that is, from one power impulse from the stator field pole during each rotor rotation). The rotation of the rotor is sustained by this energy transfer, in a manner similar to that by which the rotor of a conventional synchronous motor is driven at its synchronous speed. The frequency of the magnetic field impulses can be increased or decreased gradually, in which case the rotational speed of the rotor changes gradually in order to remain in synchronism and in phase with the magnetic field action of the stator field pole.

This manner of driving the unbalanced rotor of the simple synchronous motor of FIGS. 1 and 2 permits the use of a very convenient means for detecting the mechanical failure (fatigue fracture) in the specimen 10, and for recording the instant at which the failure was initiated. If for any reason the frequency of rotation of the rotor is forced to change from the frequency of the pulsating magnetic field, and if these frequencies remain different thereafter for a period of time sufficient for the action of the rotor to become completely out of phase with the action of the pulsating magnetic field (that is, the electromagnet 19 is then not producing a magnetic field each time the element 18 of the rotor is in the immediate vicinity of the electromagnet 19), then the rotor can no longer receive a net energy input from the electromagnet 19 during every cycle of rotation. The rotor (eccentric mass 17, element 18, bearing 15 and any other rotatable members of the assembly shown in FIGS. 1 and 2) of this simple synchronous motor does not receive energy therefore in a sufficiently consistent manner to sustain the rotation of the rotor against energy losses due to windage and friction. The motor will then decelerate to a lower rotational frequency, (a harmonic of the pulsating magnetic field frequency); or the rotor may decelerate to zero speed. In other words, a forced change in the frequency of rotation of the rotor from the frequency of the pulsating magnetic field will cause the action of the rotor to "fall out of synchronism" with the action of the magnetic field.

Mechanical failure of specimen 10 in FIG. 1 can, in two ways, cause the rotor (the bearing 15, the eccentric mass 17, the magnetically-permeable element 18 and any associated members joining these) to fall out of synchronism with the magnetic field action (and to thereafter decelerate in rotational speed). First, if the specimen 10 fractures abruptly and completely, the rotor which is supported by the specimen 10 will be subjected to an abrupt displacement with respect to the position of the stator field pole (the electromagnet 19, the solenoid 20 and the solenoid winding leads 21). This abrupt relative displacement between the rotor and the stator field pole will cause the rotor rotational action and the magnetic field action to be no longer correctly in phase; and a loss of synchronism between the rotor action and the magnetic field action will immediately occur (the rotor will decelerate to some frequency, usually zero rotations per minute, lower than the magnetic field impulse frequency).

Second, if a crack initiates and begins to propagate through specimen 10, the energy required to propagate the crack will be drawn from the kinetic energy of the rotor, because the centrifugal force components generated by the rotor are forcing the crack propagation. As the synchronous motor, of which the rotor (bearing 15, eccentric mass 17, element 18 and any members joining these) is a part, operates at very low power levels, the power (the energy transfer rate from rotor to specimen 10) required for the crack propagation can approach or exceed the amount of power which the rotor can draw from the magnetic field impulses. In that situation, the rotor action will fail out of synchronism with the magnetic field action; and the rotor will decelerate to a lower frequency (usually zero rotations per minute). Therefore, either complete abrupt fracture of the specimen 10 or the initiation and propagation of a crack in specimen 10 will be indicated, as a failure event, by the deceleration of the rotor.

The loss of synchronism between the rotor action and the magnetic field action can furthermore be used in electrically detecting the mechanical failure and in electrically recording the instant of failure. This electrical sensing and recording of the specimen failure event is accomplished as follows.

When the rotor (containing the magnetically-permeable element 18) is acting in synchronism with the pulsating magnetic field, the impedance of the electromagnet 19 to the voltage impulses is relatively high. The impedance to the voltage impulses is high because, during the periods when the higher levels of the voltage impulses are being imposed upon the solenoid winding leads 21, the magnetically permeable element 18 is very near the electromagnet 19, thereby increasing, over that period, the permeance of the magnetic flux circuit which passes through the permeable element 18 and through the core of the electromagnet 19.

When the rotational action of the permeable element 18 and the pulsating action of the magnetic field are not in synchronism and in phase, there will be periodic occasions in which the impedance of the electromagnet 19 will be relatively low during the imposition of high levels of voltage upon the solenoid leads 21. That is, when a voltage impulse is imposed upon the solenoid winding leads 21, the permeable element 18 may not be near the electromagnet 19; and the permeable element 18 may not therefore act to increase momentarily the impedance of the electromagnet 19.

When nonsynchronous behavior of rotor and magnetic field is being experienced, the above mentioned periodic combinations of high voltage impulse and low electromagnet impedance will result in momentary high rates of current increase, and associated high absolute levels of current, in the solenoid windings. These high absolute current levels will be higher than any current levels experienced in the solenoid windings during synchronous behavior of the rotor and magnetic field, all other conditions being equivalent.

The momentary relatively high values of the current accepted by the solenoid during nonsynchronous behavior can be detected by an electrical device (such as a Zener diode connected in parallel with a resistor, through which the above mentioned current is directed). The electrical device can be arranged so that, upon sensing a high current level in the solenoid windings, it will trigger a circuit action which will stop a clock or some other timing device; the stopping of the clock will record the instant at which the loss of synchronism (between the actions of the permeable element 18 and tthe pulsating magnetic field) occurred, and therefore the instant at which the mechanical failure occurred.

It can be seen therefore that a novel means for electrically detecting and recording a mechanical failure of a test specimen is facilitated by the use of the force-generating device of this invention—a synchronous motor with an unbalanced rotor. Other similar force-generating devices do not provide this means for detecting and recording failure. For example, one type of mechanical-failure-testing device employs a centrifugal force generated by a rotating eccentric mass, wherein the eccentric mass must be supported upon bearings other than those which support the motor rotor, and wherein the eccentric mass must be driven in rotation by the motor through some coupling between the rotor and the eccentric mass; in that type of device, the power rating of the motor used is rather large, for a given force-generating capacity of the device, in comparison to the power requirements for the synchronous motor of the present invention. This is due to a great degree to the additional frictional and windage consumption in the extra support bearings required, and in the coupling between driven eccentric mass and the motor. Such a device is not capable of detecting the initiation and propagation of a failure crack, as described above, because the power consumption of a propagating crack is not sufficiently large in comparison to the power consumption of the motor for the crack propagation to influence the operating behavior of the synchronous motor of that device, that is, for the beginning of crack propagation to "throw the motor rotation out of synchronism" with the action of the pulsating magnetic field which supplies the power to the rotor.

Because of the features described above, the invention provides a number of advantages. The force-generating device (which is the unbalanced-rotor synchronous motor) is of simple design, inexpensive and easy to construct in a number of different forms. A plurality of the embodiments shown in FIGS. 1, 2 and 3 could be attached to the same stationary member, such as a machine frame or the like, resulting in a multistation testing equipment of relatively low cost. (If the machine frame were of sufficient mass, there would be very little probability of significant interaction among the forces generated in the plurality of test set-ups.)

In addition, the feature that the rotor assembly is supported by only the specimen, in the embodiments shown in FIGS. 1, 2 and 3, provides an advantage in the case of setting up of a test, as the positioning of the lever arm 12 (and the members it supports) is important only with respect to the position and orientation of the specimen 10. No precise locating procedure is required when clamping the lever arm 12 to the specimen 10. In most other types of mechanical failure testing devices, there is usually a requirement for locating a specimen with reference to both a fixture which restrains the specimen and a fixture which applies loading to the specimen; this requirement makes more difficult and time-consuming the setting up of the test.

In cases where the lever arm 12 and the members it supports in the embodiment of FIGS. 1 and 2 might exert a significant and undesirable component of static loading upon the specimen 10, the entire embodiment of FIG. 1 could be revolved 90° in space so that the rotational path of the eccentric mass 17 lay in a horizontal plane. The weight of the lever arm and of the members it supports would then exert a moment upon the specimen only in the lateral direction; and this static moment, acting against the relatively large section modulus of the specimen in the lateral direction, would then produce negligible mean stresses in the specimen 10.

If it were desired to intentionally introduce large mean stress components into the test specimen, this could be achieved by the application of a mean or static force to the extensions 13 and 14 at a point near the pin 16, in the embodiment shown in FIGS. 1 and 2. This force could be the result of a weight suspended by a spring from extensions 13 and 14. The spring should have a very low spring rate coefficient in order to isolate the mass inertia effect of the weight.

A most important advantage of this invention is the versatility for application of this force-generating device; this versatility is provided by the ease with which the actuator, which is the electromagnet 19 in the embodiments of FIG. 1, can be supported and positioned in a number of ways. This versatility is also a consequence of the low mass of the force-generator (the unbalanced-rotor synchronous motor) of the invention; the force-generator can be supported by the specimen when this provides a convenience in a test. The means by which the specimen failure is detected by the same actuating member (electromagnet 19) which drives the rotor of the force generator also aids to the versatility of the invention.

In some instances, it may be of advantage to temporarily allow the rotor to "generate" the periodic voltage impulses to be applied to the actuator (electromagnet) leads, rather than to apply regularly-periodic voltage impulses generated by a separate external source. This is the case when it is necessary to start large rotors and to accelerate them from zero rotational speed to some predetermined operating speed. It is impractical to accomplish this acceleration manually on large rotors. A manner in which it is made possible to electromagnetically accelerate rotors from zero speed, by allowing the rotors to "generate" the periodic impulses of voltage applied to the actuator, is described as follows.

A switch 23, shown in FIG. 3, is positioned so as to be activated (turned on electrically) by the rotor as the mass 17 approaches the electromagnet 19 by rotation; the switch 23 is opened (turned off electrically) as the mass 17 comes to a position just adjacent to the electromagnet 19. The switch 23 is electrically connected in series with the solenoid 20 of the electromagnet 19 and with a constant-voltage source 24, as shown in FIG. 3. The turning on and off of the switch 23 by the motion of the rotor therefore commutates the voltage applied to the leads 21 of the solenoid 20, and in so dong, generates voltage impulses which are applied to leads 21. The consequence of these "rotor-generated" voltage impulses being applied at leads 21 is that the electromagnet 19 produces a magnetic field impulse whenever the mass 17 reaches a certain position relative to the electromagnet 19; and the resultant magnet force upon the magnetically-permeable element 18 causes an acceleration of the rotor.

In the above-described situation, the rotor and the electromagnet 19 acts as a variable speed commutator motor (with an unbalanced rotor), in which periodic magnetic impulses upon the rotor are automatically (by the action of switch 23) in synchronism with, and in appropriate phase relationship to, the rotor action. By an increasing of the peak voltage of the voltage impulses applied at leads 21, the rotational speed of the rotor can easily be increased. When the frequency of rotor rotation has reached the frequency at which some external source of regularly-periodic voltage impulses is operating, the switch 23 and the constant-voltage source 24 may be quickly disconnected from the leads 21, and the periodic voltage impulses from the external source may be applied to the leads 21, in which situation the rotor and the electromagnet 19 will operate as a simple synchronous motor. It should be noted that when the rotor and the electromagnet 19 are operating as a variable-speed commutating motor, the rotor speed and the magnetic field frequency cannot lose synchronism with one another. The failure detection advantages in operating the rotor and the electromagnet 19 as a synchronous motor cannot therefore be realized when the switch 23 is employed to commutate a voltage to the leads 21. Operation of the rotor and the electromagnet 19 as a variable speed commutating motor is useful therefore only during the rotor starting procedure and not during the performance of a test. It should also be noted that the switch 23 need not be activated mechanically by the rotor, but that the rotor could cut or interrupt a light beam or a special magnetic field at a certain point in each cycle of rotor rotation, and that this cutting or interrupting could be translated electrically into the action of either closing or opening the switch 23.

It should be noted that for a rotor to be started by the means described above, the rotor would have to be placed initially in a position such that the switch 23 was conducting electrical power to the actuator.

The versatility of the force-generating device, and the advantages it affords, are exhibited in a number of applications illustrated in FIG. 4 as functional sketches. In most of these applications or embodiments of the invention, the same functional elements are used: a frame D, a test specimen S, a bearing B, a pin P, an eccentric mass M, a yoke Y and a lever arm A. In some of the embodiments, several functions are provided by the same element, as discussed further in each particular case. The presence of the electromagnets is assumed but not shown in the sketches. The rotations of the masses are indicated by the dotted arrows in some of the sketches. The centrifugal forces generated are indicated by the heavy arrows labelled F.

Figure 4A:
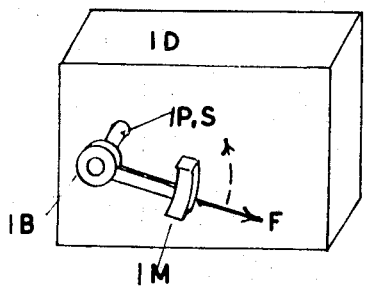
FIGS. 4A through 4I show various embodiments of the invention.
Figure 4B:
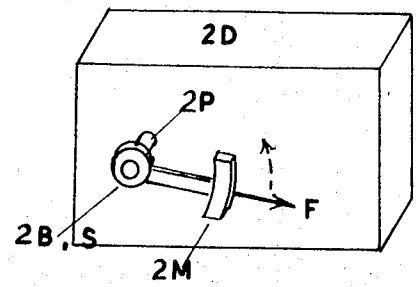

FIG. 4A illustrates a rotational-bending-stress fatigue test on a cylindrical cantilever-beam specimen 1S. The pin 1P (which supports bearing 1B) acts also as the specimen 1PS. In FIG. 4B (a bearing-fatigue test), an arrangement is similar to that in FIG. 4A is used, but the pin 2P is shorter and stronger, resulting in the bearing 2B becoming the critically-loaded member; in that instance, therefore, the bearing 2B acts also as a test specimen 2S.

Figure 4C:
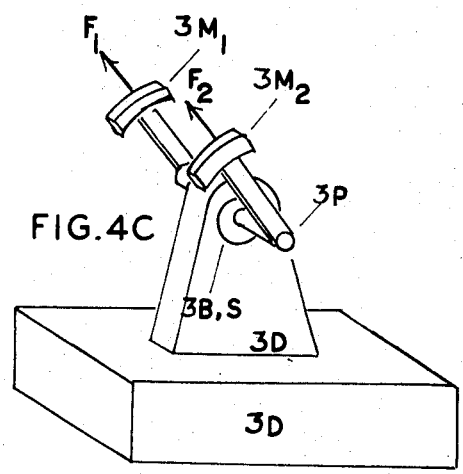

A modification of the bearing-fatigue test of FIG. 4B is illustrated in FIG. 4C, wherein two eccentric masses 3M1 and 3M2, joined by pin 3P, produce centrifugal forces F1 and F2; these forces act in parallel upon the bearings 3B, which bearing also serves as the test specimen 3S. The bearing-fatigue test of FIG. 4B involves a stationary inner bearing race and a rotating outer bearing race; the bearing-fatigue test of FIG. 4C, on the other hand, involves a rotating inner bearing race and a stationary outer bearing race. The versatility of the invention in accommodating both types of bearing-fatigue test is thereby demonstrated. (It may be noted that it has been convenient to use the pin as a rotating member in this application.)

Figure 4D:
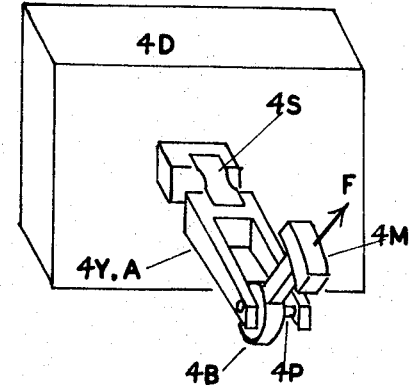

In FIG. 4D is illustrated a simple reversed-bending fatigue test of a metal-strip specimen 4S. This is the same type of embodiment illustrated in FIGS. 1, 2 and 3. It illustrates the functional element 4Y, A, which provides the function of a yoke 4Y in supporting the pin 4P, the bearing 4B and the eccentric mass 4M; the element 4Y, A also provides the function of a lever arm 4A in converting the vertical alternating component of centrifugal force F into the moment applied to the test specimen 4S.

Figure 4E:
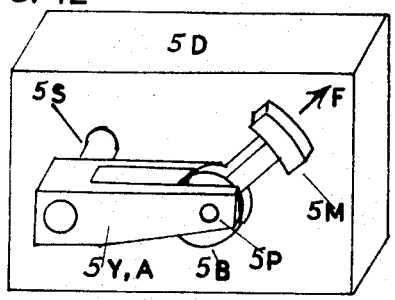

FIG. 4E illustrates a fatigue test set-up imposing combined torsional stress and rotational bending stress upon a cylindrical cantilever-beam specimen 5S, employing the lever arm 5A and the yoke 5Y to provide the torque component of loading.

Figure 4F:
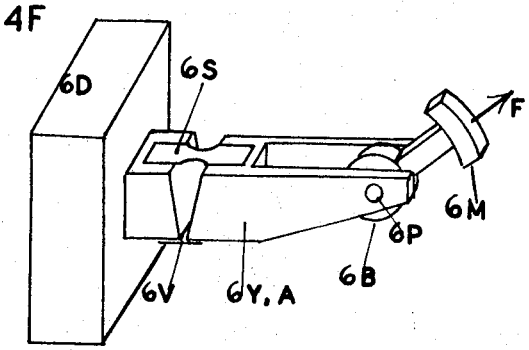

FIG. 4F illustrates an arrangement similar to that of FIG. 4D, except that a pivot 6V has been added to act as a "hinge" joining frame 6D and lever arm 6A. The consequence of adding pivot 6V is that specimen 6S and pivot 6V act as extreme-fiber members of a rather deep cantilever beam section; and, because of the low stress-gradients existing in the extreme fibers of a deep-section cantilever beam, the specimen 6S is subjected to reversed-direct-stress (tension-compression, with very little bending). This is a condition more desirable in some instances of fatigue testing than the condition of reversed bending stress illustrated in FIG. 4D.

Figure 4G:
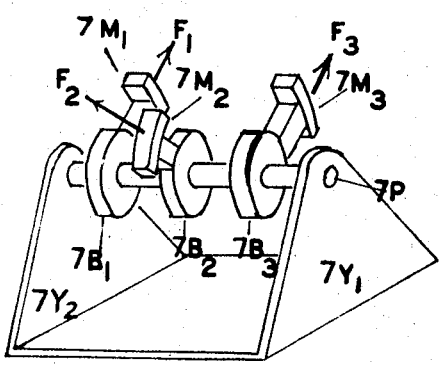

FIG. 4G illustrates a force-generating device which produces a linearly-directed periodically-alternating force. The frame 7D and the yoke extensions 7Y1 and 7Y2 support a pin 7P which supports bearings 7B1, 7B2 and 7B3. These bearings support rotating eccentric masses 7M1, 7M2 and 7M3. The masses are all caused to rotate at the same frequency, but masses 7M1 and 7M3 rotate in the direction opposite to the rotation of mass 7M2. The moments of inertia of the masses 7M1, 7M2 and 7M3 and the rotational phase angles between the masses can be maintained in such a way that the vertical components of the centrifugal forces generated by the rotating masses are additive and the horizontal components of the centrifugal forces generated by masses 7M1 and 7M3 completely and exactly nullify the horizontal component of the centrifugal force generated by mass 7M2. In this manner, the arrangement shown in FIG. 4G produces an alternating force only in the vertical direction, this force being composed of the sum of the vertical components of the centrifugal forces generated by the rotating eccentric masses 7M1, 7M2 and 7M3. This linearly-directed force could of course be directed in the horizontal direction, if desired, by revolving by 90° in space the entire physical arrangement presented in FIG. 4G. (In this application, no specimen 7S and no frame 7D are shown; the yoke shown would, in use, probably be mounted upon a machine part to be tested, which part could then act both as a specimen 7S and as the frame 7D).

Figure 4H:
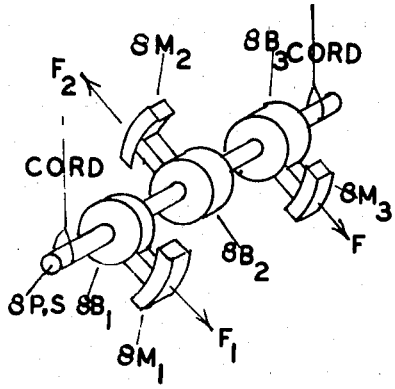

In FIG. 4H, there is illustrated a test of a cylindrical specimen 8S (the large pin 8P) under rotating bending stresses. This application is presented to demonstrate that it may be unnecessary to grip such a test specimen in a restraining fixture, such as a machine frame or the like, as has been used in the previously illustrated applications. The three rotating eccentric masses 8M1, 8M2 and 8M3 are supported at three points uniformly spaced along the pin 8P by bearings 8B1, 8B2 and 8B3. The three masses rotate in the same direction and at the same frequency; but masses 8M1 and 8M3 are caused to rotate at the zero phase angle with one another, so that the centrifugal forces they generate are at any instant acting parallel to one another and in the same directional sense, whereas mass 8M2 is caused to rotate at an angle of 180° with respect to the instantaneous positions of masses 8M1 and 8M3, so that the centrifugal force generated by the rotation of mass 8M2 is always in a direction parallel but opposite in sense to the forces generated by masses 8M1 and 8M3. In addition, the force generated by mass 8M1 is caused to be the same as the force generated by mass 8M3; and the force generated by mass 8M2 is caused to be numerically equal to the sum of the forces generated by masses 8M1 and 8M3. The result of this testing arrangement is that the test specimen 8S which is also pin 8P is subjected to a rotating-bending three-point loading situation in which all loads and moments produced balance one another; and the specimen 8S (or pin 8P) is not subjected to any net load or moment which might accelerate it in space. The specimen 8S therefore may be suspended by several light cords and is not required to be restrained or gripped by any firm stationary member. Such a testing arrangement can provide a considerable advantage in the testing of large shafts under rotating bending loading; the very heavy restraining fixtures ordinarily required in such testing might be eliminated by the use of the testing arrangement illustrated in FIG. 4H.

Figure 4I:
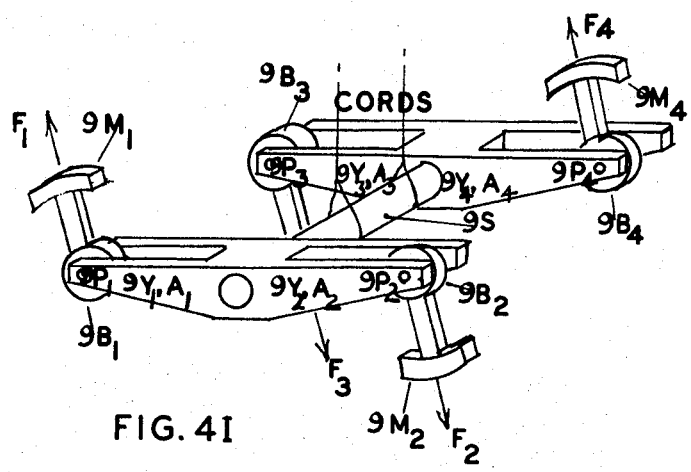

A situation similar to that illustrated in FIG. 4H is presented in FIG. 4I, wherein is shown a fatigue test arrangement of a large cylindrical specimen 9S under pure torsional stress alterations. Four rotating eccentric masses 9M1, 9M2, 9M3 and 9M4 are supported from the ends of the specimen 9S through the pins 9P1, 9P2, 9P3 and 9P4, yokes 9Y1, 9Y2, 9Y3 and 9Y4 and lever arms 9A1, 9A2, 9A3 and 9A4 shown in FIG. 4I. The masses are caused to rotate at the same frequency and in the same direction; and all four masses are of such design and size that they generate centrifugal forces, respectively, F1, F2, F3 and F4, which are numerically equal to one another. However, force F1 is caused to act always in a direction parallel but opposite in sense to the action of force F2; and force F3 is caused to act always in a direction parallel but opposite in sense to the action of force F4. The results of this arrangement is that forces F1 and F2 are caused to act as a force couple to produce a condition of pure torsion in the specimen 9S, which torsion varies in magnitude with time, but which torsion is resisted completely and exactly by a similar torsion produced by a force couple consisting of forces F3 and F4, acting upon the other end of the specimen 9S. It is possible therefore to test the specimen 9S under pure alternating torsional stresses, as illustrated in FIG. 4I, without producing any net forces, moments or torques which might accelerate the specimen 9S in space. The specimen 9S might therefore be suspended by light cords, as illustrated in FIG. 4I; and it would not be necessary to cause the specimen 9S to be affixed to, and restrained by, any firm stationary member, such as a machine frame or the like. Such a testing arrangement can provide a considerable advantage in the testing of large shafts under alternating torsional loading; the very heavy restraining fixtures ordinarily required in such testing might be eliminated by the use of the testing arrangement illustrated in FIG. 4I.

Figure 5:
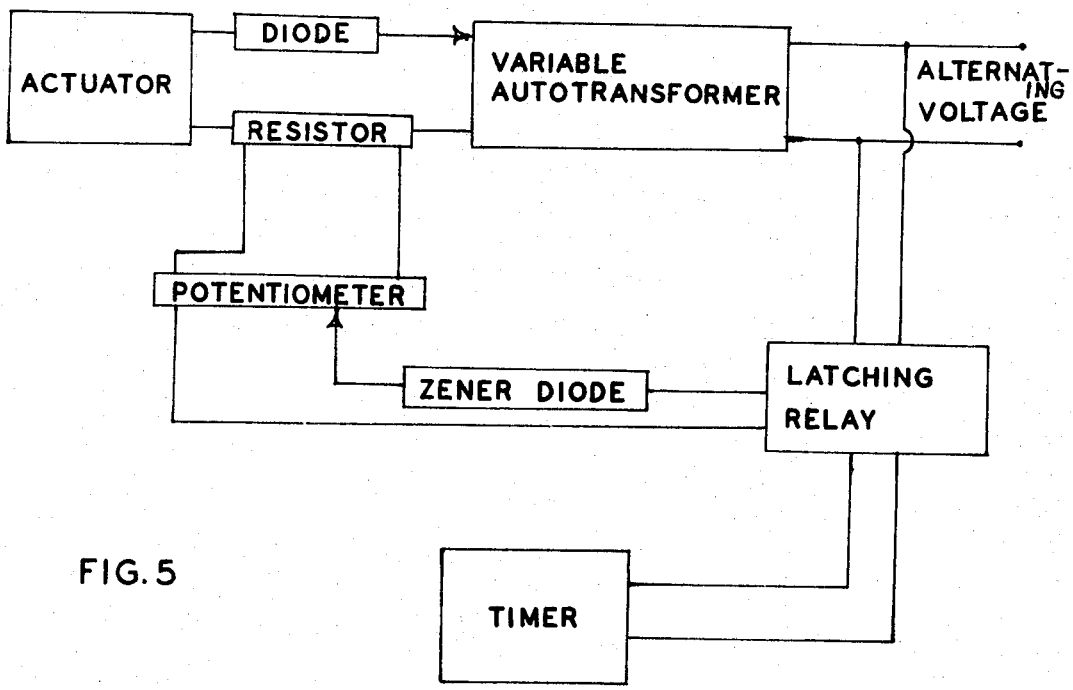
FIG. 5 is a schematic view of a control circuit for the machine.

The following description and the block circuit diagram of FIG. 5 illustrate means by which the unusually high current levels accepted by the "actuator" (the electromagnet 19 in FIGS. 1 and 2) are detected and recorded as failure events by the testing device of this invention. When the failure test has been put into operation (that is, when the unbalanced rotor is rotating in synchronism with the pulsating magnetic field from the actuator), the electrical power supplied to the actuator comes from the source labelled "alternating voltage" in FIG. 5. This alternating voltage is also conveyed through the contacts of the "latching relay" (initially latched in the conducting state) to drive the "timer" of FIG. 5. The power supplied to the actuator passes through the "variable autotransformer," which can be used to control the voltage to the actuator. The current supplied to the actuator from the autotransformer must pass through the "diode" and the "resistor;" the diode rectifies the alternating voltage, so that only "half-wave" rectified current pulses are permitted to pass through the actuator.

As these current pulses pass also through the resistor, they produce half-wave voltage pulses across the terminals of the resistor and of the "potentiometer." A component of this periodic voltage pulse from the potentiometer is exerted upon the circuit containing the "Zener diode" and the latching relay. The periodic voltage from the potentiometer may be adjusted so that the peak voltage imposed on the Zener diode during each pulse is just below the break-down voltage of the Zener diode; in that situation, the circuit containing the latching relay would be non-conducting and the relay would remain latched.

When a mechanical failure in a testing situation occurs in such a manner as to increase the current levels accepted by the actuator (as described previously in this paper), the periodic voltage pulses across the terminals of the resistor and of the potentiometer will increase accordingly and the peak voltages impressed upon the Zener diode will exceed the Zener diode breakdown voltage. In that case, the Zener diode will become conducting in the direction of the voltage pulses; and a current will flow in the circuit containing the latching relay, resulting in the unlatching of that relay. When the relay becomes unlatched, the timer becomes separated electrically from the source of the alternating voltage; the timer then stops and thereby records the instant at which the mechanical failure occurred. The principles illustrated by the block circuit in FIG. 5 may be modified as may be convenient to the application of the invention. For example, other electrical components which are triggered electrically from a nonconducting state to a conducting state may be used in place of the Zener diode. In addition, it may be convenient to amplify the current in the Zener diode before applying it to a latching relay.

The embodiments of the invention in which an exclusive property or privilege is claimed are defined as follows:

1. A machine for imposing dynamic mechanical loads on structural members comprising
 a rotatable member,
 a bearing supporting said rotatable member for rotation about its center of rotation,
 an axle for supporting said bearing,
 means for attaching said axle to said structural member,
 an eccentric mass supported on said rotatable member at a distance from said center of rotation for rotation about said center of rotation,
 an actuating member disposed at one side of said axle, having means to exert magnetic field impulses adjacent said actuating member, said magnetic impulses being produced at a predetermined frequency,
 means supporting said actuating member adjacent the path of rotation of said eccentric mass whereby said actuating member exerts a magnetic force impulse on said mass directly each time said mass passes said actuating member when said mass is rotating at the exact frequency at which said magnetic field impulses are being produced by said actuator and when said mass is passing adjacent said actuating member at the instant said magnetic impulses reach their peak.

2. The machine recited in claim 1 wherein said actuating means comprises an intermittent magnetic field means and magnetic means on said eccentric member adapted to be attracted by said magnetic field mass.

3. The machine recited in claim 2, wherein means is provided to attach a first part of a specimen to be tested to said support means,
 and said machine has means thereon to attach a part of said machine to a part of said specimen remote from said first part.

4. The machine recited in claim 3, wherein said structural member comprises an elongated member fixed at one end to a support and fixed to said support means at a remote end whereby said elongated member is fixed as a cantilever beam.

5. The machine recited in claim 1 wherein means is provided to adjust the frequency of the magnetic field forces applied by said magnetic member.

6. The machine recited in claim 1, wherein means is provided to attach a first part of a specimen to be tested to a fixed support, and said machine has means thereon to attach to a part of said specimen remote from said first part to means at said axis of rotation.

7. The machine recited in claim 1 wherein the actuating member consists of an electromagnet.

8. In a vibration testing machine having a means to fix a first part of a specimen thereto, an eccentric rotatable load rotatable about an axle, and means to attach said eccentric load to a said specimen at a position remote from said first part, wherein the improvement comprises an actuating member on said machine spaced from and disposed on the side of said load remote from said axle, said actuating member having means thereon for supplying windage and friction losses to said eccentric load whereby said eccentric load is kept in motion.

9. The machine recited in claim 8 wherein a motor means is connected to said eccentric load to accelerate it to the predetermined speed.

10. The machine recited in claim 8 wherein said machine comprises a shaft, means adapted to be attached to said shaft, said means being fixed to said specimen at an end opposite said shaft.

11. The machine recited in claim 10 wherein two said eccentric loads are provided, said eccentric loads each being attached to a rotatable shaft and extending from said shaft in a direction 180 degrees from each other.

12. A machine for generating periodically-alternating forces for testing of structural members comprising a rotatable member supported about its center of rotation, an eccentric mass supported upon said rotatable member for rotation about said center of rotation, an actuating member disposed at one side of said center of rotation, a magnetically-permeable member fixed to said rotatable member and comprising said eccentric mass for receiving magnetic force impulses from said actuating member and for transmitting said force impulses to said rotatable member, said actuating member having means to exert magnetic force impulses upon said magnetically-permeable member at a predetermined frequency, means supporting said actuating member adjacent the path of rotation of said magnetically-permeable member, whereby said actuating member can exert a magnetic force impulse upon said magnetically-permeable member directly each time said permeable member passes said actuating member, and when the frequency of rotation of said rotatable member is in synchronism with the frequency of said magnetic force impulses, means being provided for accelerating said rotatable member from zero rotational speed to a predetermined operating speed, said means being to temporarily apply to the windings of said actuating member a series of special periodic voltage impulses, said actuating member being an electromagnet, said special periodic voltage impulses being initiated by an action of said rotatable member, so as to cause said special periodic voltage impulses to occur always at the frequency at which said rotatable member rotates, and so as to cause each of the said special periodic voltage impulses to be initiated and terminated at points in time corresponding to two specific positions of said rotatable member with respect to the position of said actuating member, said initiation and termination of each of said special periodic voltage impulses being accomplished by an activation and deactivation of an electrical switch, said electrical switch being activated and deactivated at said points in time by an action of the said rotatable member, said electrical switch being activated and deactivated so as to connect and disconnect a source of constant voltage into a circuit with the said windings of said actuating member.

13. The machine recited in claim 12 wherein means is provided to detect a loss of synchronism between the action of the rotation of said rotatable member and the action of the pulsation of the magnetic force impulses provided by said actuating member, and wherein the detected loss of synchronism is an indication of a mechanical failure of the test specimen which failure causes the loss in synchronism.

14. The machine recited in claim 13 wherein the means of detecting the loss of synchronism and the associated mechanical failure consists of monitoring the current accepted by the said actuating member and consists of detecting the instant at which the current assumes levels unusually higher than would be accepted by said actuating member during periods of synchronism between the said rotational action of the said rotatable member and the action of the said pulsation of the said magnetic force impulses.

15. The machine recited in claim 13 wherein the means for monitoring the current accepted by the said actuator consists of an electrical resistance element wherein said resistance element is caused to conduct the same current as passes through the said actuating member, and wherein an electronic element is connected in parallel circuitry with said resistance element.

16. The machine recited in claim 15 wherein said electronic element is adapted to increase greatly in electrical conductance when high voltage levels, above a certain critical voltage level, are applied to said electronic element, said high voltage levels being the consequence of high current levels passing through the actuating member and the resistance element, said high current levels being the consequence of the loss of synchronism associated with a mechanical failure event.

17. The machine recited in claim 16 wherein a separate electronic element is provided and wherein said increase in conductance of said electronic element is detected by a separate electronic device, said electronic device being adapted to act to stop a timing device which timing device therefore records the instant at which occurred the mechanical failure, the associated loss of synchronism, the associated high current levels, and the associated increase in conductance of the electronic element.

18. A machine for fatigue testing mechanical structural members comprising a rotatable member, support means supporting said rotatable member for rotation about its center of rotation, means for attaching said support means to said structural member, an eccentric mass supported on said rotatable member at a distance from said center of rotation for rotation about said center of rotation, an actuating member having means to exert a force on said eccentric mass at a predetermined frequency, means supporting said actuating member adjacent the path of rotation of said eccentric mass whereby said actuating member exerts a force on said mass directly each time said mass passes said actuating member, said means of accelerating said rotatable member comprises an impulse of a jet of air directed tangentially against the said rotatable member.

19. The machine recited in claim 18 wherein means is provided to vary the frequency of application of said air jet.

20. A testing machine comprising a fixed support for attaching a first end of a specimen to be tested,
a yoke,
means to fix said yoke to a second end of said specimen at a position spaced from said fixed support,
an arm rotatably supported on said yoke,
an eccentric mass fixed to said arm at a position spaced from said yoke,
and magnetic means on said machine adapted to exert an intermittent force on said mass whereby said mass is rotated.

21. The machine recited in claim 20 wherein said arm is rotatable in a path of rotation disposed at right angles to said specimen.

22. The machine recited in claim 20 wherein at least two said arms are fixed to said yoke, a mass is fixed to each said arm and each said arm in a different direction than the other from said yoke.

References Cited

UNITED STATES PATENTS

| 1,635,787 | 7/1927 | Hort | 73—100 X |
| 2,551,289 | 5/1951 | Quinlan | 73—100 X |
| 2,924,730 | 2/1960 | Spitler | 310—81 |
| 3,135,106 | 6/1964 | Lazan | 73—93 X |
| 3,383,531 | 5/1968 | Gafencu | 318—114 X |

JERRY W. MYRACLE, Primary Examiner

U.S. Cl. X.R.

73—71.5; 310—81